(12) United States Patent
Zhou et al.

(10) Patent No.: US 11,360,817 B2
(45) Date of Patent: Jun. 14, 2022

(54) METHOD AND TERMINAL FOR ALLOCATING SYSTEM RESOURCE TO APPLICATION

(71) Applicant: HUAWEI TECHNOLOGIES CO., LTD., Guangdong (CN)

(72) Inventors: Zhenkun Zhou, Hangzhou (CN); Yuqiong Xu, Hangzhou (CN); Wei Wu, Hangzhou (CN)

(73) Assignee: Huawei Technologies Co., Ltd., Guangdong (CN)

( * ) Notice: Subject to any disclaimer, the term of this patent is extended or adjusted under 35 U.S.C. 154(b) by 239 days.

(21) Appl. No.: 16/365,961

(22) Filed: Mar. 27, 2019

(65) Prior Publication Data
US 2019/0220320 A1 Jul. 18, 2019

Related U.S. Application Data

(63) Continuation of application No. PCT/CN2017/102330, filed on Sep. 19, 2017.

(30) Foreign Application Priority Data

Sep. 27, 2016 (CN) .......................... 201610855261.0

(51) Int. Cl.
*G06F 9/46* (2006.01)
*G06F 9/50* (2006.01)
(Continued)

(52) U.S. Cl.
CPC ............ *G06F 9/5038* (2013.01); *G06F 9/445* (2013.01); *G06F 9/4881* (2013.01);
(Continued)

(58) Field of Classification Search
CPC ...... G06F 9/5038; G06F 9/445; G06F 9/4881; G06F 9/5005; G06N 20/00
See application file for complete search history.

(56) References Cited

U.S. PATENT DOCUMENTS 8,176,437 B1 * 5/2012 Taubman ............ G06F 9/44578
715/810
8,468,110 B1 6/2013 Podgorny et al.
(Continued)

FOREIGN PATENT DOCUMENTS

CN 102891916 B 1/2013
CN 103034516 B 4/2013
(Continued)

OTHER PUBLICATIONS

PCT International Search Report issued in International Application No. PCT/CN2017/102330 dated Dec. 5, 2017, 20 pages (with English translation).
(Continued)

*Primary Examiner* — Tammy E Lee
(74) *Attorney, Agent, or Firm* — Fish & Richardson P.C.

(57) ABSTRACT

This application provides a method and a terminal for allocating a system resource to an application. The method includes: predicting, by a terminal based on a current status of the terminal, a target application to be used; reserving, by the terminal for the target application based on the prediction result, a system resource required for running the target application; and providing, by the terminal according to a resource allocation request of the target application, the reserved system resource for the target application to use.

12 Claims, 4 Drawing Sheets

100

A terminal predicts, based on a current status of the terminal, a target application to be used by a user — S101

The terminal reserves, for the target application based on a prediction result, a system resource required for running the target application — S102

The terminal provides, according to a resource allocation request of the target application, the reserved system resource for the target application to use — S103

(51) Int. Cl.
  *G06F 9/445* (2018.01)
  *G06N 20/00* (2019.01)
  *G06F 9/48* (2006.01)

(52) U.S. Cl.
  CPC ........... *G06F 9/5005* (2013.01); *G06N 20/00* (2019.01); *G06F 2209/5014* (2013.01)

(56) References Cited

U.S. PATENT DOCUMENTS

| | | | | |
|---|---|---|---|---|
| 8,909,950 | B1* | 12/2014 | Levchuk | H04B 17/391 |
| | | | | 713/300 |
| 10,587,471 | B1* | 3/2020 | Bramhill | G06F 9/5077 |
| 2008/0005736 | A1* | 1/2008 | Apacible | G06F 9/4843 |
| | | | | 718/100 |
| 2012/0324481 | A1 | 12/2012 | Xia et al. | |
| 2014/0115146 | A1 | 4/2014 | Johnson et al. | |
| 2014/0372356 | A1* | 12/2014 | Bilal | G06F 9/44578 |
| | | | | 706/46 |
| 2015/0149514 | A1 | 5/2015 | Kim et al. | |
| 2015/0256476 | A1* | 9/2015 | Kurtzman | G06F 16/24578 |
| | | | | 709/226 |
| 2016/0315999 | A1 | 10/2016 | Sun | |
| 2016/0379105 | A1* | 12/2016 | Moore, Jr. | G06F 21/316 |
| | | | | 706/11 |

FOREIGN PATENT DOCUMENTS

| | | | |
|---|---|---|---|
| CN | 103425564 | A | 12/2013 |
| CN | 103593479 | A | 2/2014 |
| CN | 104281472 | A | 1/2015 |
| CN | 104572264 | A | 4/2015 |
| CN | 104572265 | A | 4/2015 |
| CN | 104572300 | A | 4/2015 |
| CN | 104699606 | A | 6/2015 |
| CN | 104737565 | B | 6/2015 |
| CN | 104915224 | A | 9/2015 |
| CN | 105224369 | A | 1/2016 |
| CN | 105431822 | A | 3/2016 |
| CN | 105491056 | A | 4/2016 |
| CN | 105939416 | A | 9/2016 |
| EP | 2672781 | B1 | 12/2013 |

OTHER PUBLICATIONS

Extended European Search Report issued in European Application No. 17854730.3 dated Jul. 10, 2019, 6 pages.

Office Action issued in Chinese Application No. 201610855261.0 dated Jul. 12, 2019, 9 pages.

Yan et al., "Fast App Launching for Mobile Devices Using Predictive User Context," Proceedings of the 10th international conference on Mobile systems, applications, and services MobiSys'12, XP55106616, Jun. 25-29, 2012, 14 pages.

* cited by examiner

METHOD AND TERMINAL FOR ALLOCATING SYSTEM RESOURCE TO APPLICATION

CROSS-REFERENCE TO RELATED APPLICATIONS

This application is a continuation of International Application No. PCT/CN2017/102330, filed on Sep. 19, 2017, which claims priority to Chinese Patent 201610855261.0, filed on Sep. 27, 2016. The disclosures of the aforementioned applications are hereby incorporated by reference in their entireties.

TECHNICAL FIELD

This application relates to the field of terminals, and in particular, to a method and a terminal for allocating a system resource to an application.

BACKGROUND

In the field of terminals including smartphones, a most important task of an operating system of a terminal is to maintain system resource allocation. There are a plurality of types of system resources, for example, a central processing unit (CPU) resource represented in a form of a time slice, a memory resource represented in a form of a memory page, an input/output (I/O) resource represented in a form of bandwidth, and a broadcast resource. In the prior art, a manner of allocating a system resource by a terminal includes: An operating system of the terminal extracts, according to a resource allocation request sent by an application to the operating system, a system resource from current remaining system resources and allocates the system resource to the application. However, when an application having a relatively great system resource requirement (for example, a camera application having a relatively great memory resource requirement) needs to be started, if current available resources of the system cannot satisfy the requirement of the application, the operating system enters a slow system resource allocation path, to be specific, the operating system first needs to release an occupied system resource and then allocates a resource to the application after sufficient system resources are released. Such a system resource allocation method features relatively low efficiency, and increases an application startup time, thereby affecting user experience.

SUMMARY

This application provides a method and a terminal for allocating a system resource to an application, so as to allocate a system resource to an application in a timelier manner, and reduce an application startup delay.

According to a first aspect, a method for allocating a system resource to an application is provided, including: predicting, by a terminal based on a current status of the terminal, a target application to be used by a user; reserving, by the terminal for the target application based on a prediction result, a system resource required for running the target application; and providing, by the terminal according to a resource allocation request of the target application, the reserved system resource for the target application to use. Optionally, the reserving a system resource includes reserving, for the target application, an idle system resource greater than or equal to a system resource requirement of the target application.

In this embodiment of this application, the to-be-used target application of the terminal is predicted, and sufficient system resources are reserved for the target application before the resource allocation request of the target application is received. In this way, the system resource can be allocated to the target application in a timely manner, an application startup delay is reduced, and user experience is improved.

In a possible implementation, the method further includes: predicting, by the terminal, a use time point of the target application; and the reserving, by the terminal for the target application based on a prediction result, a system resource required for running the target application includes: reserving, by the terminal, the system resource for the target application before the use time point.

In this embodiment of this application, the use time point of the target application is predicted, and the system resource is reserved for the target application before the use time point of the target application. In this way, the resource can be allocated to the target application in a timely manner before the resource allocation request of the target application is received, an application startup delay is reduced, and user experience is improved.

In a possible implementation, the predicting, by the terminal, a use time point of the target application includes: predicting, by the terminal, the use time point of the target application based on a machine learning model, where a model parameter of the machine learning model is determined based on historical data of using the target application by the user.

In a possible implementation, the machine learning model includes an exponential distribution model; and the predicting, by the terminal, a use time point of the target application includes: predicting, by the terminal, the use time point of the target application by using the exponential distribution model, where the exponential distribution model is used to indicate a probability of using the target application in a target time range.

In a possible implementation, the target time range is a time range between a time point when the target application is used last time and a target time point, and the target time point is a time point after a current time point.

In a possible implementation, the target time range is a time range between a first time point and a second time point, the first time point is a current time point or a time point after a current time point, and the second time point is a time point after the first time point.

In a possible implementation, the predicting, by the terminal, the use time point of the target application by using the exponential distribution model includes: collecting, by the terminal, statistics on an average quantity of use times of the target application in a unit time; determining, by the terminal, a model parameter of the exponential distribution model based on the average quantity of use times; and predicting, by the terminal, the use time point of the target application based on the exponential distribution model and the model parameter of the exponential distribution model.

In a possible implementation, the machine learning model includes a hidden Markov model; and the predicting, by the terminal, a use time point of the target application includes: predicting the use time point of the target application by using the hidden Markov model, where the hidden Markov model is used to indicate a probability of using the target application in a target discrete time range.

In a possible implementation, the reserving, by the terminal for the target application based on a prediction result, a system resource required for running the target application includes: when current idle system resources do not satisfy a resource requirement of the target application, releasing, by the terminal, some occupied system resources to obtain updated idle system resources, so as to allocate the system resource to the target application.

In a possible implementation, the predicting, based on a current status of the terminal, a target application to be used by a user includes: predicting, by the terminal based on the current status of the terminal, a plurality of candidate applications to be used by the user, where the plurality of candidate applications include the target application; and the reserving, by the terminal based on a prediction result, a system resource for the target application includes: collecting statistics on a system resource required by each of the plurality of candidate applications; determining a maximum volume of each type of system resource in system resources required by the plurality of candidate applications; and reserving each type of system resource for the target application based on types of the system resources and the maximum volume of each type of system resource.

In a possible implementation, the types of the system resources include at least one of the following resources: a memory resource, a central processing unit CPU resource, and an input/output IO resource.

In a possible implementation, the predicting a target application to be used by a user includes starting, by the terminal, to predict the target application after receiving a foreground-background switching instruction.

According to a second aspect, a terminal is provided. The terminal includes modules configured to perform the method in the first aspect. Based on a same inventive concept, a principle of resolving a problem by the terminal is corresponding to that of the solution in the method design of the first aspect. Therefore, for implementation of the terminal, refer to the implementation of the method, and details are not described herein again.

According to a third aspect, a terminal is provided, including a memory, configured to store a program; and a processor, configured to execute the program in the memory. When executing the program, the processor is configured to perform the method in the first aspect.

According to a fourth aspect, a computer storage medium is provided. The computer storage medium is configured to store a computer program. The computer program includes an instruction used for performing the method in any one of the first aspect and the possible implementations of the first aspect.

DESCRIPTION OF EMBODIMENTS

The following describes the technical solutions in the embodiments of this application with reference to the accompanying drawings in the embodiments of this application.

It should be understood that, in the embodiments of this application, a terminal may also be referred to as user equipment (UE), a mobile station (MS), a mobile terminal, or the like. For example, the terminal may be a mobile phone (or referred to as a "cellular" phone), or a computer. For example, the terminal may alternatively be a portable, pocket-sized, handheld, or in-vehicle apparatus. The terminal may alternatively be any intelligent device that relates to direct interaction with a user and that needs to perform system resource allocation.

This application provides a method and a terminal for allocating a system resource to an application. A main concept of this application is: A to-be-used target application of a terminal is predicted based on learning of user behaviors; and before a user operation triggers a system resource requirement of the target application, sufficient system resources are reserved for the target application in advance based on the predicted to-be-used target application. This avoids entering a slow system resource allocation path due to lack of system resources, so that the system resource can be allocated in a timely manner, an application startup delay is reduced, and user experience is improved.

Figure 1:
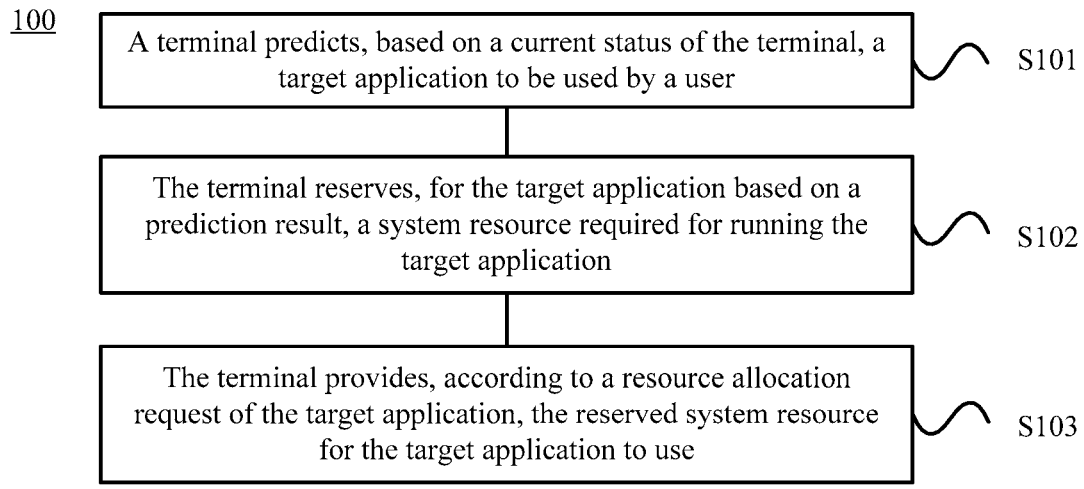
FIG. 1 is a schematic block diagram of a method for allocating a system resource to an application according to an embodiment of this application.

FIG. 1 is a schematic diagram of a method 100 for allocating a system resource to an application according to an embodiment of this application. As shown in FIG. 1, the method 100 may be performed by a terminal. The method 100 includes the following steps.

S101. The terminal predicts, based on a current status of the terminal, a target application to be used by a user.

Optionally, the to-be-used target application of the terminal may be predicted in a plurality of manners. For example, the current status of the terminal may be obtained; and the to-be-used target application of the terminal is predicted based on the current status of the terminal. More specifically, a behavior model of a user behavior may be learned in advance based on historical record data of the user behavior; and the to-be-used target application of the terminal is predicted based on the current status of the terminal and the behavior model of the user behavior.

Optionally, the current status of the terminal may include a plurality of types of status information. The status information may include scenario information, time information, location information, or other information. For example, the scenario information may include that the user is currently in a static state, a running state, or a walking state. The status information may further include current remaining power information, wireless network connection status information, Bluetooth connection status information, earphone connection status information, and the like of the terminal.

Optionally, the behavior model of the user behavior may be learned in advance based on a machine learning model. The machine learning model may be a logistic regression model, a collaborative filtering model, a random walk model, or another machine learning model. This is not limited in this embodiment of this application. In an example, the logistic regression model may include a Softmax model. The Softmax model is an incremental learning algorithm. In the incremental learning algorithm, in a training process, feature data of a new training sample may be converged while an originally learned model parameter is ensured. To be specific, in an incremental learning process, sample data that has been learned does not need to be retained, and an original behavior model may be continuously updated through periodic training, so that a behavior model is getting closer to an actual use habit of the user behavior.

Optionally, a prediction result may include a plurality of to-be-used target applications. For example, the plurality of to-be-used target applications may be determined based on the current status of the terminal and the behavior model of the user behavior. The terminal may perform, on at least one target application in the prediction result, system resource pre-allocation recorded in this embodiment of this application.

Optionally, the predicting a to-be-used target application of the terminal may be triggered after the terminal receives a foreground-background switching instruction; or the predicting a to-be-used target application of the terminal may be triggered under a specific trigger condition (for example, when the user performs a specific operation); or the predicting a to-be-used target application of the terminal may be triggered periodically. This is not limited in this embodiment of this application.

In an example, the predicting a to-be-used target application of the terminal may be triggered when it is detected that the user triggers a Home button of the terminal.

S102. The terminal reserves, for the target application based on a prediction result, a system resource required for running the target application.

Optionally, the system resource may include a plurality of types of resources. For example, the system resource may include at least one of the following resources: a memory resource, a CPU resource, an IO resource, and a broadcast resource.

Optionally, the reserved system resource required for running the target application may be the required system resource that satisfies running of the target application. In other words, an idle system resource greater than or equal to a system resource requirement of the target application may be reserved for the target application.

Optionally, when a user operation received by the terminal instructs to start the target application, an operating system of the terminal receives a resource allocation request that is of the target application and that is used to request to allocate the system resource to the target application. For example, when the system resource requested by the target application is the memory resource and the operating system is an Android system, a virtual machine sends the resource allocation request (for example, the resource allocation request may include a dynamic memory application) to the operating system by using a system interface, to apply for the system resource required by the target application. The system resource may be reserved for the target application before the resource allocation request of the target application is received, so as to ensure a speed of allocating the resource to the target application and further reduce an application startup delay.

Optionally, there are a plurality of manners of reserving, for the target application before the resource allocation request of the target application is received, the system resource required for running the target application. For example, in a manner, the system resource may be reserved for the target application immediately after the to-be-used target application is predicted. In another manner, the system resource may be reserved for the target application after a preset time after the to-be-used target application is predicted. The preset time may be determined based on experience. For example, the preset time may be determined based on learning of the historical record data of the user behavior. In still another manner, a use time point of the to-be-used target application may be further predicted after the to-be-used target application is predicted, and the system resource is reserved for the target application before the use time point of the target application.

S103. The terminal provides, according to a resource allocation request of the target application, the reserved system resource for the target application to use.

Optionally, after the terminal receives the resource allocation request of the target application, because the terminal has retained, for the target application in advance, sufficient system resources for running the target resource, the terminal can provide, in a timely manner, the reserved resource for the target application to use.

In this embodiment of this application, the to-be-used target application of the terminal is predicted, and sufficient system resources are reserved for the target application before the resource allocation request of the target application is received. In this way, the resource can be allocated to the target application in a timely manner, an application startup delay is reduced, and user experience is improved.

Optionally, the method 100 further includes: predicting, by the terminal, a use time point of the target application; and the reserving, by the terminal for the target application based on a prediction result, a system resource required for running the target application includes: reserving, by the terminal, the system resource for the target application before the use time point.

The use time point of the target application may be a time point at which the user starts to use the target application, or may be a startup time point at which the user starts to start the target application. After the startup time point, the terminal receives the resource allocation request that is of the target application and that is used to request the system resource for completing a startup process of the target application. In other words, the use time point of the target application is earlier than a time point at which the target application sends the resource application request. If the system resource is reserved for the target application before the use time point of the target application, it can be ensured that the resource is reserved for the target application before the resource allocation request of the target application is received.

In this embodiment of this application, the use time point of the target application is predicted, and the system resource is reserved for the target application before the use time point of the target application. In this way, the resource can be allocated to the target application in a timely manner before the resource allocation request of the target application is received, an application startup delay is reduced, and user experience is improved.

Optionally, in the method 100, after predicting the use time point of the target application, the terminal may determine, based on the use time point of the target application, a time point of reserving the system resource for the target application. For example, the system resource may be reserved for the target application ahead of a preset time after the use time point of the target application is predicted. The preset time may be an empirical value.

The use time point of the target application is predicted, and the time point of reserving the system resource for the target application is further determined. This can avoid wasting power consumption and resources due to extremely early reservation of the system resource, and can avoid reducing a system resource allocation speed due to extremely late reservation of the system resource.

Optionally, in the method 100, the terminal may predict the use time point of the target application based on the machine learning model, where a model parameter of the machine learning model is determined based on historical data of using the target application by the user.

The machine learning model may be a function, and the function includes an unknown model parameter. The model parameter of the machine learning model may be estimated through learning of historical data, and then new data is predicted or analyzed by using the machine learning model. There are a plurality of types of machine learning models. For example, the machine learning model includes the logistic regression model and a linear regression model. The logistic regression model may include an exponential distribution model, a conditional regression model, a hidden Markov model, and the like. The linear regression model may include an auto-regressive and moving average model (ARMA). A type of the machine learning model is not limited in this embodiment of this application.

Optionally, the historical data may include historical record data of using the target application by the user. For example, the historical data may be time information, location information, and power information when the user uses the target application.

The use time point of the target application may be predicted based on the machine learning model in a plurality of manners. For example, in a manner, the use time point of the target application may be predicted based on the logistic regression model. The logistic regression model may be used to indicate a probability that the use time point of the target application falls within a target time range. Specifically, a model parameter of the logistic regression model may be determined based on the historical record data of the user behavior. Then the probability of using the target application in the target time range is determined based on the logistic regression model. When the probability of using the target application in the target time range is greater than or equal to a preset threshold, the use time point of the target application may be determined based on the target time range. For example, a start time point or an end time point of the target time range may be determined as the use time point of the target application. In this embodiment of this application, a value of the preset threshold may be determined based on experience. For example, the value of the preset threshold may be determined based on the historical record data of the user behavior.

In an example, the preset threshold may be set to 30%, the start time point of the target time range may be a current time point, and when the probability of using the target application in the target time range is greater than or equal to the preset threshold, the end time point of the target time range may be used as the use time point of the target application.

In another example, the preset threshold may be set to 80%, and the target time range may be a time range between a first time point and a second time point. The first time point may be a current time point or a time point after a current time point, and the second time point may be after the first time point. When the probability of using the target application in the target time range is greater than or equal to the preset threshold, the start time point of the target time range may be used as the use time point of the target application. In this manner, the logistic regression model may include the exponential distribution model or another type of logistic regression model.

In another manner, the logistic regression model may be learned based on the historical record data of the user behavior. A probability of using the target application in a target discrete time range is determined based on the logistic regression model obtained through learning. If a probability of using the target application in a discrete time range is greater than or equal to a preset threshold, the use time point of the target application may be determined based on the discrete time range. For example, a start time point or an end time point of the discrete time range may be used as the use time point of the target application. In this manner, the logistic regression model may include a conditional random field model, the hidden Markov model, or another type of logistic regression model.

In still another manner, the linear regression model may be learned based on the historical record data of the user behavior, to directly predict the use time point at which the target application is used. In this manner, the linear regression model may include the auto-regressive and moving average model (Auto-Regressive and Moving Average Model, ARMA) or another type of linear regression model.

With reference to specific examples, the following describes in detail a manner of predicting the use time point of the target application. It should be noted that the following examples are merely used to help a person skilled in the art understand the embodiments of this application, and not intended for limiting the embodiments of this application to the enumerated specific values or specific scenarios. Apparently, a person skilled in the art may make various equivalent modifications or variations based on the given examples, and these modifications or variations also fall within the scope of the embodiments of this application.

Figure 2:
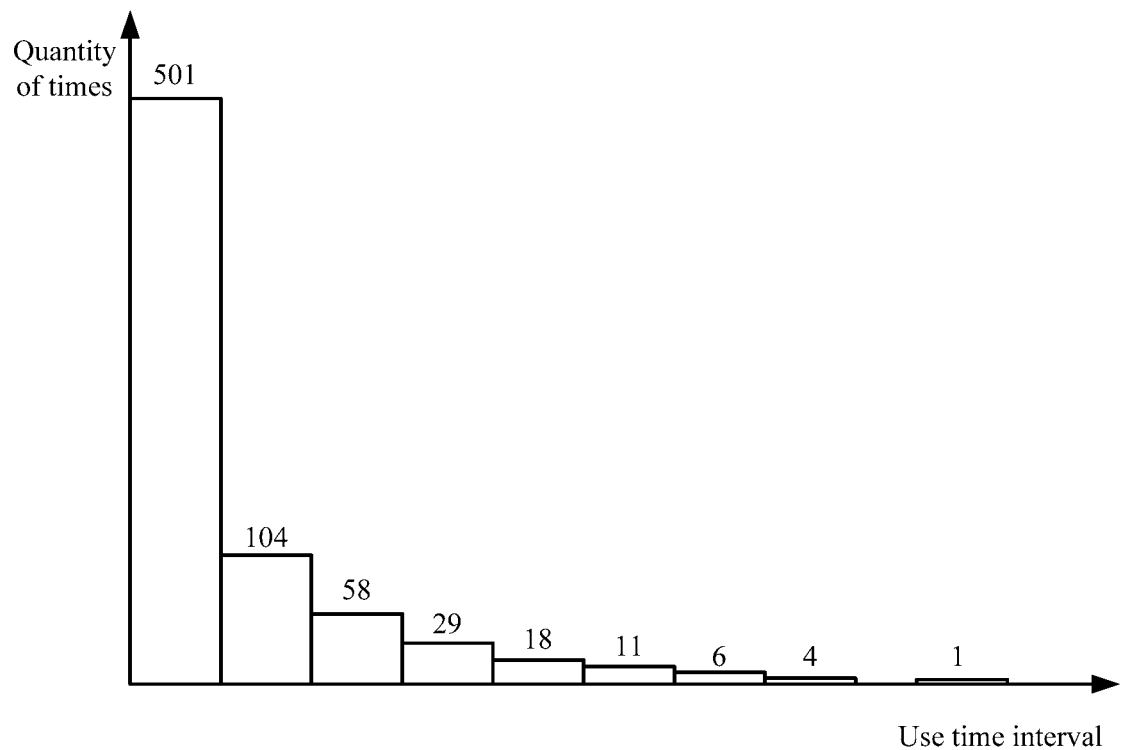
FIG. 2 is a schematic distribution diagram of a time interval for using an application according to an embodiment of this application.

In an example, a manner of predicting the use time point of the target application based on the exponential distribution model is first described. A person skilled in the art can understand that if a quantity of event occurrence times in a unit time complies with Poisson distribution whose model parameter is r, a time sequence of two time intervals for consecutive event occurrence complies with exponential distribution whose model parameter is r. In this embodiment of this application, a quantity of times the target application is used in the unit time complies with Poisson distribution. In other words, a use time interval of the target application complies with exponential distribution. Therefore, the use time point of the target application may be predicted based on the exponential distribution model. For example, FIG. 2 is a distribution diagram of a time interval between two consecutive times of switching an application program to a foreground in a typical scenario in which a user uses the application program. A horizontal coordinate indicates the time interval between two consecutive times of switching the application, for example, 1 to 15 minutes, or 15 to 30 minutes. A vertical coordinate indicates a quantity, obtained through statistics collection, of times in two consecutive times of switching the application. It can be learned from FIG. 2 that, based on a statistics result, a use time interval at which the application program is used complies with exponential distribution.

It can be learned from above that the exponential distribution model may be used to indicate the probability of using the target application in the target time range. In other words, the exponential distribution model may be used to indicate a probability that the use time interval of the target application falls within the target time range. The use time interval of the target application may be a time interval between two consecutive times of using the target application by the user. For example, the use interval of the target application may include a time interval between two consecutive times of switching the target application to the foreground; or include a time in which the target application stays on the background. A probability of using the target application in a time range may be predicted based on the exponential distribution model. If the probability of using the target application in the time range is greater than or equal to the preset threshold, the use time point of the target application may be determined based on the time range.

In an example, after the to-be-used target application is predicted, a third time point at which the target application is most recently used is determined. Then the target time range of the target application may be determined based on the exponential distribution model and the preset threshold. A probability that a use time interval between the third time point at which the target application is most recently used and a time point at which the target application is used next time falls within the target time range (in other words, the probability of using the target application in the target time range) is greater than or equal to the preset threshold. The use time point at which the target application is used next time may be obtained by adding up the third time point and a time length of the target time range.

Optionally, in the method 100, before the use time point of the target application is predicted by using the exponential distribution model, an average quantity of use times of the target application in the unit time may be obtained through statistics collection, and a model parameter of the exponential distribution model is determined based on the average quantity of use times. For example, a reciprocal of the average quantity of use times may be determined as the model parameter of the exponential distribution model.

In an example, the exponential distribution model may be expressed by using an exponential distribution probability density function. A formula of the exponential distribution probability density function is as follows:

$$f(x; \lambda) = \begin{cases} \lambda e^{-\lambda x}, & x \geq 0, \\ 0, & x < 0 \end{cases},$$

where x indicates a time point, and $\lambda$ indicates the model parameter. The function may indicate a probability of using the target application at any time point. An area that is between a curve and a coordinate axis x and that is corresponding to any two time points indicates a probability of using the target application in a time range between the two time points. The reciprocal of the average quantity, obtained in advance through statistics collection, of use times of the target application in the unit time may be determined as $\lambda$. The use time point of the target application may be determined in two manners based on the exponential distribution model. In a first manner, the probability of using the target application in the target time range may be determined. The start time point of the target time range may be a time point at which the target application is used last time, and the end time point of the target time range may be a time point after the current time point. When the probability of using the target application in the target time range is greater than or equal to the preset threshold, the use time point of the target application may be determined based on the target time range. For example, the end time point of the target time range may be directly determined as the use time point of the target application. In a second manner, a time point corresponding to the preset threshold may be determined based on the preset threshold and the exponential distribution model. A probability of using the target application in a time range from a first time point at which the target application is used last time to the time point corresponding to the preset threshold is equal to the preset threshold. The use time point of the target application is determined based on the time point corresponding to the preset threshold. For example, the time point corresponding to the preset threshold may be directly determined as the use time point of the target application.

Optionally, in different time ranges, behavior habits of using the target application by the user are different. A time in which the target application is used may be divided into a plurality of time ranges. For example, 24 hours in one day may be divided into 12 time ranges, and each time range includes two hours. An exponential distribution model corresponding to each of the plurality of time ranges is determined. For example, a quantity of times the target application is used in the unit time in each time range may be obtained through statistics collection, to determine a model parameter of the exponential distribution model corresponding to each time range. An exponential distribution model corresponding to a time range to which a current time belongs may be selected based on the current time, and then the use time point of the target application is predicted based on the selected exponential distribution model.

In an example, the following describes a method for predicting the use time point of the target application based on the conditional random field model or the hidden Markov model. Both the conditional random field model and the hidden Markov model are used to indicate a probability of using the target application in a discrete time range. For example, a discrete time range may be selected from time. Based on the conditional random field model or the hidden Markov model, a probability of using the target application in each discrete time range is predicted. When the probability of using the target application in the target discrete time range is greater than or equal to the preset threshold, the use time point of the target application may be determined based on the target discrete time range. For example, an end time point of the target discrete time range may be determined as the use time point of the target application. For ease of understanding of this embodiment of this application, the hidden Markov model is used as an example for description. The hidden Markov model includes a visible state and a hidden state. A model parameter of the hidden Markov model may indicate a transition relationship between hidden states and indicate a weight of impact of the hidden state on the visible state. A state in which the target application is used and a state in which the target application is not used may be used as visible states. The status information of the terminal may be used as the hidden state. For example, the hidden state may include geographical location information of the terminal, the remaining power information of the terminal, and current time information. It is assumed that N hidden states are included. Based on the historical record data of the user behavior, a transition probability between the N hidden states of the hidden Markov model, and a weight of impact of the N hidden states on the visible state may be learned. Further, a probability of occurrence of the visible state is calculated based on the learned hidden Markov model, to predict the use time point of the target application.

A method for predicting the use time point of the target application by using the conditional random field model is similar to that for predicting the use time point of the target application by using the hidden Markov model. Details are not described herein again.

In an example, the following describes a manner of directly predicting the use time point of the target application based on ARMA(m, n). An output of ARMA(m, n) may indicate a time interval between two consecutive times of using the target application, where (m, n) indicates that a change rule of the ARMA may be expressed as m-order linear impact of the target application and n-order random noise impact. In other words, a next use time interval of the target application is affected by previous m use time intervals of the target application. The next use time interval of the target application may be used as a predicted output of ARMA(m, n), and the predicted output is denoted as $Y_t$. $Y_t$ may be a random sequence. $Y_t$ indicates a $t^{th}$ time interval. $Y_t$ may indicate continuity of a time interval in historical use by the user. $Y_t$ is externally affected and also has its own change rule. $Y_t$ may be expressed as follows by using a formula:

$$Y_t = \sum_{i=1}^{m} \varphi_i Y_{t-i} - \sum_{j=1}^{n} \theta_j \alpha_{t-j} + \alpha_t,$$

where $Y_{t-i}$ indicates a $(t-i)^{th}$ time interval, $\alpha_t$ indicates an error term between $Y_t$ and a $t^{th}$ actual time interval, $\alpha_{t-j}$ indicates an error term between $Y_{t-j}$ and a $(t-j)^{th}$ actual time interval, $\varphi_i$ indicates a weight coefficient of $Y_{t-i}$, $\theta_j$ indicates a weight coefficient of $\alpha_{t-j}$, m, n, and t are integers greater than or equal to 1, $1 \leq i \leq m$, and $1 \leq j \leq n$. If the term $\alpha\_t$ is ignored, a calculation process of $Y_t$ is degraded as m-order linear regression of $Y_t$, and calculation may be performed in a manner of calculating a parameter in linear regression.

If the term $\alpha\_t$ is not ignored, because an expected value of $\alpha\_t$ is 0, an expected value of $Y_t$ in the ARMA(m, n) model may be expressed as follows:

$$E[Y_t] = \sum_{i=1}^{m} \varphi_i Y_{t-i} - \sum_{j=1}^{n} \theta_j \alpha_{t-j} + \alpha_{t-j}$$

Values of m and n may be empirical values. For example, the values of m and n may be empirical values learned from the historical record data. For example, m=3 and n=1. Learning, according to ARMA(m, n), historical data of using the target application by the user may be equivalent to an estimation process of three φ_i parameters and one θ_j parameter. φ_i may be first calculated by using a covariance function, and then values of θ_j and $\alpha_t$ are calculated based on φ_i. Alternatively, values of $\varphi_i$, $\theta_j$, and $\alpha_t$ are calculated by using another parameter estimation method.

In an example, a next use time interval of a target application may be expressed as follows:

$Y_t = -0.98Y_{t-1} + 0.5Y_{t-2} + 0.72Y_{t-3C} + 0.018\alpha\_(t-1)$

Optionally, in the method 100, the reserving a system resource for the target application includes: determining whether current idle system resources satisfy a resource requirement of the target application; and when the current idle system resources do not satisfy the resource requirement of the target application, releasing an occupied system resource, so as to reserve the system resource for the target application. When it is determined that the current idle system resources satisfy the resource requirement of the target application, it indicates that the current idle system resources are sufficient for the target application to use and an operation of releasing an occupied resource may not be performed.

In this embodiment of this application, the to-be-used target application of the terminal is predicted, and the occupied system resource is released in advance to reserve the system resource for the target application. This ensures that the system resource is allocated to the target application in a timely manner, thereby ensuring fast startup of the target application and improving user experience.

Optionally, in the method 100, the predicting, based on a current status of the terminal, a target application to be used by a user includes: predicting, by the terminal based on the current status of the terminal, a plurality of candidate applications to be used by the user, where the plurality of candidate applications include the target application; and the reserving, by the terminal based on a prediction result, a system resource for the target application includes: collecting statistics on a system resource required by each of the plurality of candidate applications; determining a maximum volume of each type of system resource in system resources required by the plurality of candidate applications; and reserving each type of system resource for the target application based on types of the system resources and the maximum volume of each type of system resource.

In a specific example, it is assumed that the terminal predicts that three candidate applications are to be used in a next time range. Statistics collection may be performed on a system resource required by each of the three candidate applications. A maximum volume in the system resources that are obtained through statistics collection and that are required by the three candidate applications is reserved for the target application. When there are a plurality of types of system resources, a maximum volume of each of the plurality of types of system resources required by the three candidate applications may be reserved for the target application.

Optionally, in the method 100, the predicting, based on a current status of the terminal, a target application to be used by a user includes: predicting, by the terminal based on the current status of the terminal, a plurality of candidate applications to be used by the user, where the plurality of candidate applications include the target application; and the reserving, by the terminal based on a prediction result, a system resource for the target application includes: collecting statistics on a system resource required by each of the plurality of candidate applications; performing, based on values of probabilities that the plurality of candidate applications are used, weighted calculation on each type of system resource in system resources required by the plurality of candidate applications; and reserving each type of system resource for the target application based on a result of the weighted calculation.

In an example, under a given trigger mechanism (for example, foreground-background switching or timing detection), after a plurality of to-be-used target applications are predicted, probabilities of using the plurality of target applications in the target time range may be predicted. If a probability of using a target application in the target time range is greater than or equal to the preset threshold, a use time point of the target application is determined based on the target time range, and it is determined whether current remaining system resources satisfy a system resource requirement of the target application. If the current remaining system resources do not satisfy the system resource requirement of the target application, a system resource is reclaimed before the start time point of the target time range, to reserve sufficient system resources for the target application. If it is predicted that probabilities of using at least two of the plurality of target applications in the target time range are greater than or equal to the preset threshold, use time points of the at least two target applications may be determined based on the target time range. In addition, resources are reserved for the at least two target applications before the use time points of the at least two target applications. Specifically, a maximum volume of system resources required by each of the at least two target applications may be used as a reserved system resource. Alternatively, the at least two target applications may be sorted based on probabilities of using the at least two target applications, and weighted calculation is performed based on a sorting weight difference, to obtain the system resources that need to be reserved.

In this embodiment of this application, use time points of a plurality of target applications are predicted, and system resources are reserved for the plurality of target applications before the use time points of the plurality of target applications. In this way, the resources can be allocated to the target applications in a timely manner before allocation requests of the target applications are received, an application startup delay is reduced, and user experience is improved.

The foregoing describes the method for allocating a system resource to an application in the embodiments of this application with reference to FIG. 1 and FIG. 2. The following describes in detail a terminal in the embodiments of this application with reference to FIG. 3 to FIG. 6. For ease of description, for content of the terminal in FIG. 3 to FIG. 6 that is same as or similar to that in the method in FIG. 1 and FIG. 2, refer to specific descriptions in FIG. 1 and FIG. 2. Details are not described herein again.

Figure 3:
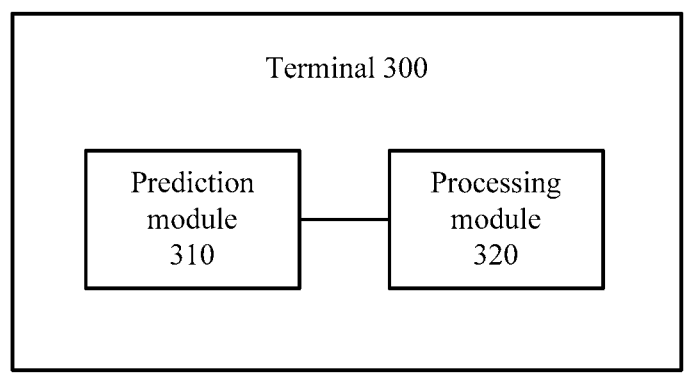
FIG. 3 is a schematic structural diagram of a terminal according to an embodiment of this application.

FIG. 3 is a schematic block diagram of a terminal 300 according to an embodiment of this application. The terminal 300 may perform the steps performed by the terminal in the foregoing method. The terminal 300 includes:

a prediction module 310, configured to predict, based on a current status of the terminal, a target application to be used by a user; and a processing module 320, configured to reserve, for the target application based on a prediction result, a system resource required for running the target application.

The processing module 320 is further configured to provide, according to a resource allocation request of the target application, the reserved system resource for the target application to use.

In this embodiment of this application, the to-be-used target application of the terminal is predicted, and sufficient system resources are reserved for the target application before the resource allocation request of the target application is received. In this way, the resource can be allocated to the target application in a timely manner, an application startup delay is reduced, and user experience is improved.

The prediction module 310 and the processing module 320 in FIG. 3 may be implemented by a processor or a controller, for example, may be implemented by a central processing unit (CPU), a general-purpose processor, a digital signal processor (DSP), an application-specific integrated circuit (ASIC), a field programmable gate array (FPGA), another programmable logic device, a transistor logic device, a hardware component, or a combination thereof. The processor or the controller may implement or execute examples of various logical blocks, modules, and circuits that are described with reference to the content disclosed in this application. The processor may also be a combination implementing a computing function, for example, a combination including one or more microprocessors, or a combination of a DSP and a microprocessor.

Figure 4:
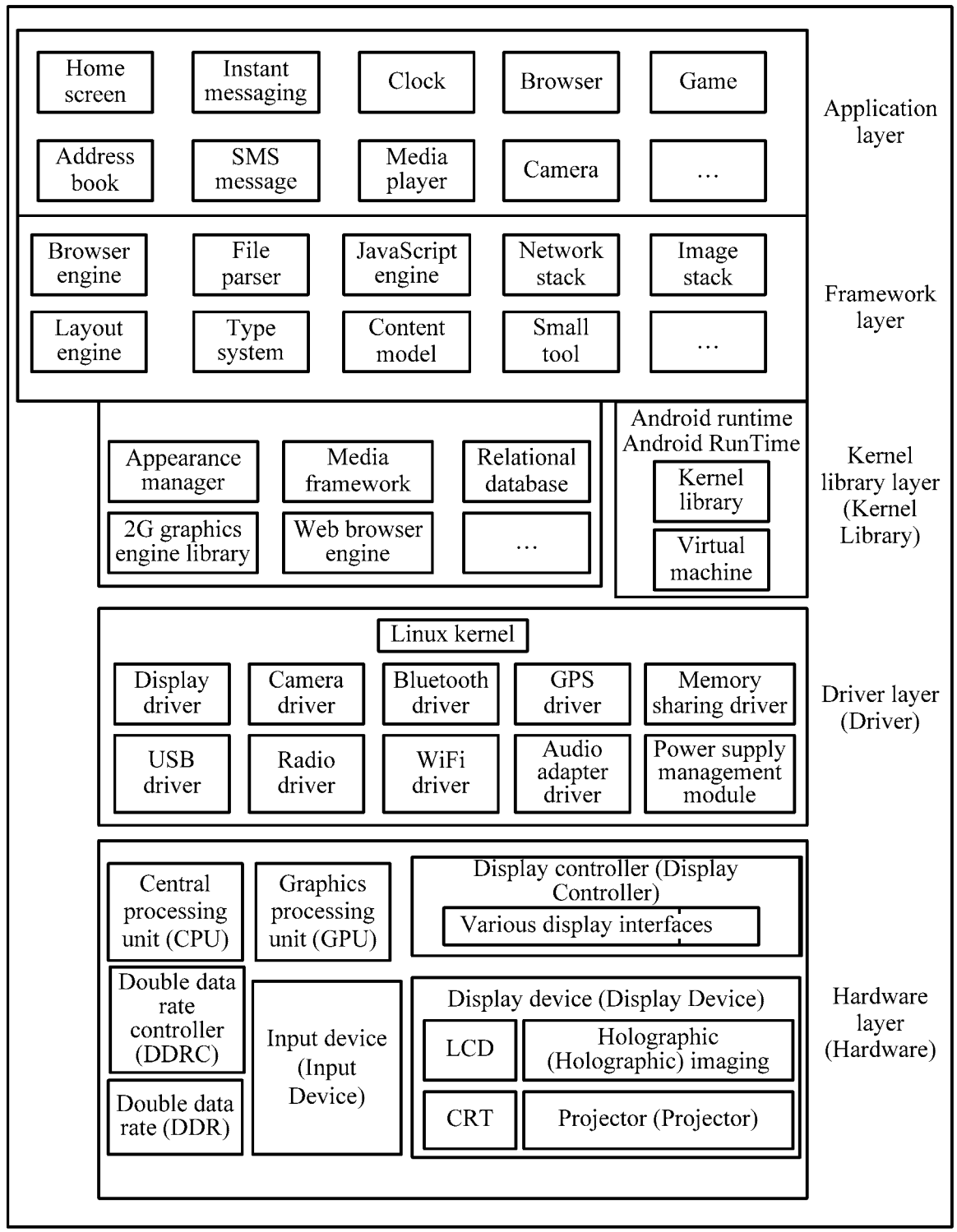
FIG. 4 is a schematic structural diagram of a terminal according to another embodiment of this application.

The following uses FIG. 4 as an example to describe a terminal provided in an embodiment of this application. The terminal may be specifically a smartphone. As shown in FIG. 4, a hardware layer of the terminal includes a central processing unit (CPU), a graphics processing unit (GPU), and the like, and certainly, may further include a memory, an input/output device, a double data rate, a double data rate controller, a network interface, and the like. The input device may include a keyboard, a mouse, a touchscreen, and the like. The output device may include a display device such as a liquid crystal display (LLCD), a cathode-ray tube (CRT), a holographic imaging device, or a projector. An operating system (such as Android or Firefox OS) and some application programs may run above the hardware layer.

FIG. 4 describes a software system architecture of a terminal by using the Android system as an example. A kernel library is a core part of the operating system, and includes an appearance manager, a media framework, a relational database, a 2G graphics engine library, a Web browser engine, a kernel library, a virtual machine (for example, Dalvik Virtual Machine), and the like. Execution of allocating a system resource to an application in the embodiments of this application may be implemented by the virtual machine (for example, Dalvik Virtual Machine). To be specific, the virtual machine predicts, through compilation based on a current status of the terminal, a target application to be used by a user; reserves, for the target application based on a prediction result, a system resource required for running the target application; and provides, according to a resource allocation request of the target application, the reserved system resource for the target application to use.

In addition, the terminal further includes a driver layer, a framework layer, and an application layer. The driver layer may include a CPU driver, a GPU driver, a display controller driver, and the like. The framework layer may include a browser engine, a layout engine, a file parser, and the like. The application layer may include a plurality of application programs such as a home (home) screen, a media player (Media Player), and a browser (Browser).

Optionally, a software system architecture of a terminal that uses the Firefox OS system in an example is similar to the software system architecture of the terminal in FIG. 4. The framework layer in this embodiment of this application may include a browser engine, a layout engine, a file parser, a JavaScript engine, and the like. Execution of the method for allocating a system resource to an application in the embodiments of this application may be implemented by the JavaScript engine of the framework layer.

Figure 5:
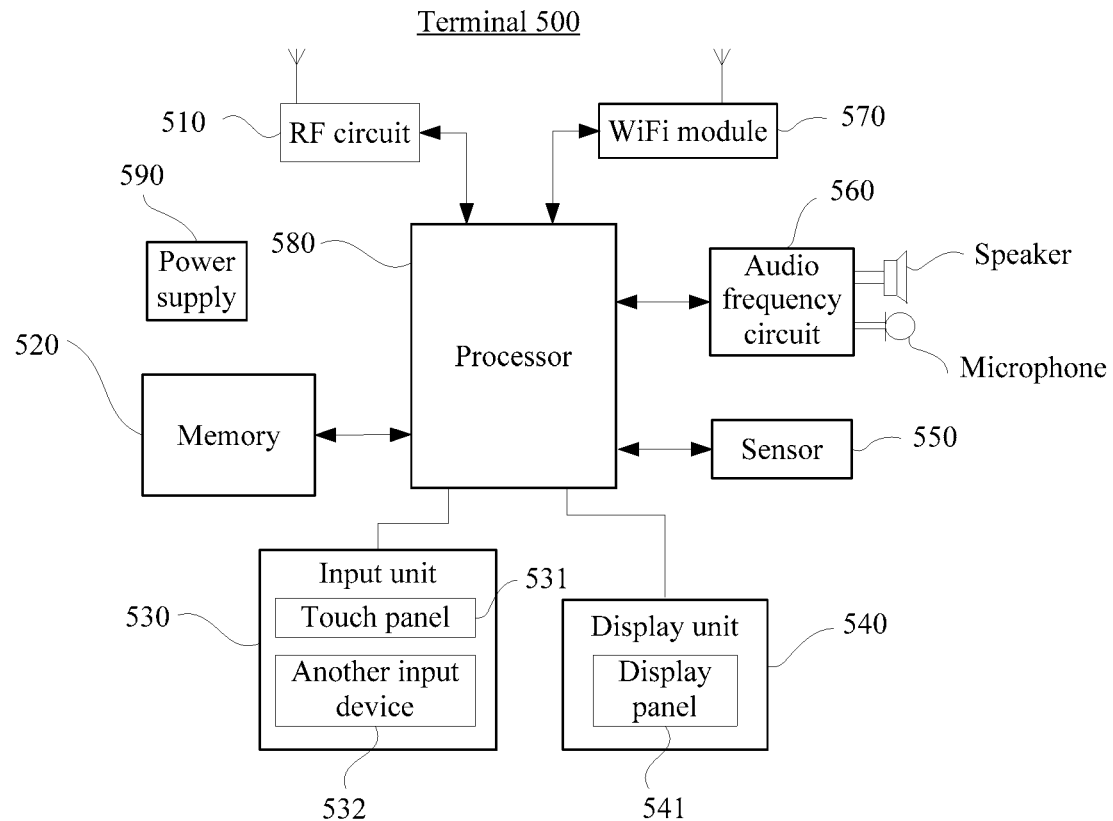
FIG. 5 is a schematic structural diagram of a terminal according to another embodiment of this application.

FIG. 4 describes, from a perspective of a software system architecture of a terminal, the terminal for allocating a system resource to an application in the embodiments of this application. FIG. 5 describes the terminal in the embodiments of this application from a perspective of a hardware architecture of a terminal. The central processing unit of the hardware layer in FIG. 4 may be a processor 580 in FIG. 5. The input device in FIG. 4 may be an input unit 530 in FIG. 5. The display device of the hardware layer in FIG. 4 may be a display unit 540 in FIG. 5.

FIG. 5 is a partial structural block diagram of a terminal 500 according to an embodiment of this application. The terminal 500 in FIG. 5 may be, for example, a mobile phone. Referring to FIG. 5, the terminal 500 includes components such as a radio frequency (Radio Frequency, RF) circuit 510, a memory 520, an input unit 530, a display unit 540, a sensor 550, an audio frequency circuit 560, a Wireless Fidelity (WiFi) module 570, a processor 580, and a power supply 590. A person skilled in the art can understand that the terminal structure shown in FIG. 5 constitutes no limitation to the terminal, and the terminal may include components more or fewer than those shown in the figure, or include a combination of some components, or include components that are differently disposed.

Specifically, in an implementation of FIG. 5, the memory 520 is configured to store a program, and the processor 580 is configured to execute the program stored in the memory 520. When executing the program, the processor 580 is configured to: predict, through compilation based on a current status of the terminal, a target application to be used by a user; reserve, for the target application based on a prediction result, a system resource required for running the target application; and provide, according to a resource allocation request of the target application, the reserved system resource for the target application to use.

It can be understood that the memory 520 may be an internal memory of the terminal 500 or an internal memory and an external memory of the terminal 500. The memory 520 includes a non-volatile memory (such as Non-Volatile Random Access Memory, NVRAM), a dynamic random access memory (DRAM), a static random access memory (SRAM), a flash memory, and a hard disk, an optical disc, a USB flash drive, a floppy disk, or a tape machine.

The input unit 530 may be configured to receive entered digit or character information, for example, a Chinese character string or a letter string that is entered by a user, and generate signal input related to user setting and function control of the terminal 500. Specifically, in this embodiment of this application, the input unit 530 may include a touch panel 531. The touch panel 531, also referred to as a touchscreen, may collect a touch operation performed by the user on or near the touch panel 531 (such as an operation performed by the user on or near the touch panel 531 by using any proper object or accessory such as a finger or a stylus), and drive a corresponding connection apparatus according to a preset program. Optionally, the touch panel 531 may include two parts: a touch detection apparatus and a touch controller. The touch detection apparatus detects a touch orientation of the user, detects a signal brought by the touch operation, and sends the signal to the touch controller. The touch controller receives touch information from the touch detection apparatus, converts the touch information into contact coordinates, and sends the contact coordinates to the processor 580, and can receive and execute a command sent by the processor 580. In addition, the touch panel 531 may be implemented in various types, such as a resistive type, a capacitive type, an infrared type, and a surface acoustic wave type. In addition to the touch panel 531, the input unit 530 may include another input device 532. The another input device 532 may include but is not limited to one or more of a physical keyboard, a function key (such as a volume control key and an on/off key), a trackball, a mouse, a joystick, and the like.

The terminal 500 may further include the display unit 540. The display unit 540 may be configured to display information entered by the user or information provided for the user, and various menus of the terminal 500. Specifically, the display unit 540 may include a display panel 541. Optionally, the display panel 541 may be configured by using a liquid crystal display (LCD), an organic light-emitting diode (OLED), or a like form.

In this embodiment of this application, the touch panel 531 covers the display panel 541, to form a touch display screen. After detecting a touch operation on or near the touch display screen, the touch display screen transmits the touch operation to the processor 580, to determine a touch event type. Subsequently, the processor 580 provides corresponding visual output on the touch display screen based on the touch event type.

In this embodiment of this application, the to-be-used target application of the terminal is predicted, and sufficient system resources are reserved for the target application before the resource allocation request of the target application is received. In this way, the resource can be allocated to the target application in a timely manner, an application startup delay is reduced, and user experience is improved.

In this embodiment of this application, the touch display screen includes an application program interface display region and a common control display region. An arrangement manner of the application program interface display region and the common control display region is not limited, and may be an arrangement manner in which the two display regions can be distinguished, such as top and bottom arrangement or left and right arrangement. The application program interface display region may be used to display an interface of an application program. Each interface may include interface elements such as an icon of at least one application program and/or a widget desktop control. The application program interface display region may alternatively be a blank interface including no content. The common control display region is used to display frequently used controls, for example, a setting button icon, an interface number, a scroll bar, and a phonebook icon.

The processor 580 is a control center of the terminal 500, and is connected to the components of the entire mobile phone by using various interfaces and lines. The processor 580 runs or executes a software program and/or module and data that are stored in the memory 520, to perform various functions of the terminal 500 and process data, so as to perform overall monitoring on the terminal 500. Optionally, the processor 580 may include one or more processing units.

Figure 6:
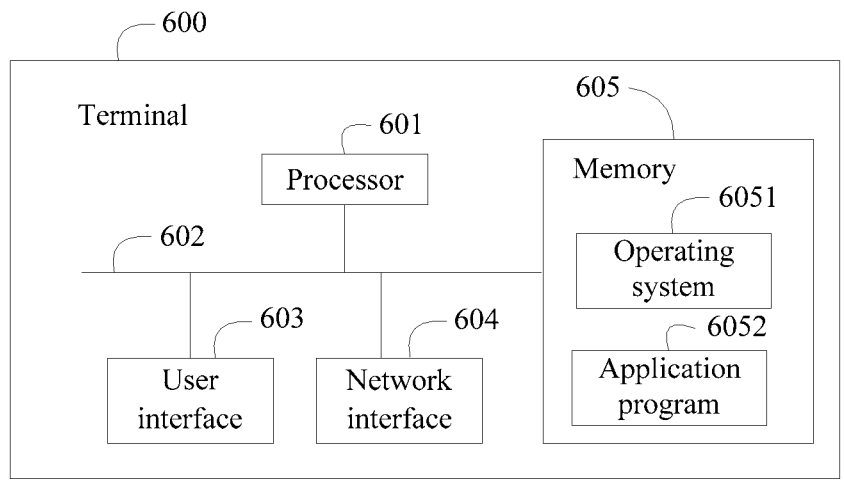
FIG. 6 is a schematic structural diagram of a terminal according to another embodiment of this application.

FIG. 6 describes a structure of a terminal 600 according to an embodiment of this application. The terminal 600 includes: at least one processor 601, at least one network interface 604 or another user interface 603, a memory 605, and at least one communications bus 602. The communications bus 602 is configured to implement connection and communication between these components. Optionally, the terminal device 600 includes the user interface 603, including a display (for example, a touchscreen, an LCD, a CRT, a holographic imaging device, or a projector), a keyboard, or a click device (for example, a mouse, a trackball, a touch pad, or a touchscreen).

The memory 605 may include a read-only memory and a random access memory, and provide an instruction and data for the processor 601. A part of the memory 605 may further include a non-volatile random access memory (NVRAM).

In some implementations, the memory 605 stores the following elements: an executable module or a data structure, or a subset thereof, or an extended set thereof:

an operating system 6051, including various system programs, for example, the framework layer, the kernel library layer, and the driver layer that are shown in FIG. 4, and configured to implement various basic services and process a hardware-based task; and an application program module 6052, including various application programs, for example, the launcher, the media player, and the browser that are shown in FIG. 4, and configured to implement various application services.

In this embodiment of this application, by invoking a program or an instruction stored in the memory 605, the processor 601 is configured to: predict, through compilation based on a current status of the terminal, a target application to be used by a user; reserve, for the target application based on a prediction result, a system resource required for running the target application; and provide, according to a resource allocation request of the target application, the reserved system resource for the target application to use.

In addition, the terminal device 600 may further perform the methods and embodiments in FIG. 1 and FIG. 2. Details are not described again in this embodiment of this application.

Therefore, according to the foregoing solution, the to-be-used target application of the terminal is predicted, and sufficient system resources are reserved for the target application before the resource allocation request of the target application is received. In this way, the resource can be allocated to the target application in a timely manner, an application startup delay is reduced, and user experience is improved.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for allocating a system resource to an application, comprising:
    predicting, by a terminal based on a current status of the terminal, a target application to be used, wherein the current status comprises remaining power information;
    predicting, by the terminal and based on a machine learning model, a use time point of the target application, wherein the machine learning model comprises a hidden Markov model, the hidden Markov model includes at least one visible state and at least one hidden state, the at least one hidden state includes at least one of geographical location information of the terminal, the remaining power information of the terminal, or current time information of the terminal, and the at least one visible state includes a state in which the target application is used or a state in which the target application is not used, and the hidden Markov model includes a model parameter that indicates a weight of impact of the at least one hidden state on the at least one visible state;
    reserving, by the terminal for the target application based on a result of the predicting of the target application and the use time point, a system resource required for running the target application before the use time point; and
    providing, by the terminal according to a resource allocation request of the target application, the reserved system resource for the target application.

2. The method according to claim 1, wherein further comprises:
    determining, based on the use time point of the target application, a time point of the reserving the system resource for the target application.

3. The method according to claim 1, wherein the reserving the system resource comprises:
    when current idle system resources do not satisfy a system resource requirement of the target application, releasing, by the terminal, one or more occupied system resources.

4. The method according to claim 1, wherein the predicting the target application to be used comprises: predicting, by the terminal based on the current status of the terminal, a plurality of target applications to be used; and the reserving the system resource, comprises:
collecting statistics on a system resource required by each of the plurality of target applications;
determining a maximum volume of each type of system resource in system resources required by the plurality of target applications; and
reserving each type of system resource for one or more of the plurality of target applications based on types of the system resources and the maximum volume of each type of system resource.

5. The method according to claim 4, wherein the types of the system resources comprise at least one of the following resources: a memory resource, a central processing unit (CPU) resource, or an input/output (I/O) resource.

6. The method according to claim 1, wherein the predicting the target application to be used comprises:
starting, by the terminal, to predict the target application after receiving a foreground-background switching instruction.

7. A terminal, comprising:
one or more processors; and
a memory storing a program, wherein the program, when executed, cause the one or more processors to:
predict, based on a current status of the terminal, a target application to be used, wherein the current status comprises remaining power information;
predict, based on a machine learning model, a use time point of the target application, wherein the machine learning model comprises a hidden Markov model, the hidden Markov model includes at least one visible state and at least one hidden state, the at least one hidden state includes at least one of geographical location information of the terminal, the remaining power information of the terminal, or current time information of the terminal, and the at least one visible state includes a state in which the target application is used or a state in which the target application is not used, and the hidden Markov model includes a model parameter that indicates a weight of impact of the at least one hidden state on the at least one visible state;
reserve, for the target application based on a result of the predicting of the target application and the use time point, a system resource required for running the target application before the use time point; and
provide, according to a resource allocation request of the target application, the reserved system resource for the target application.

8. The terminal according to claim 7, wherein the program, when executed, cause the one or more processors further to: determine, based on the use time point of the target application, a time point of the reserving the system resource for the target application.

9. The terminal according to claim 7, wherein the program, when executed, cause the one or more processors further to: when current idle system resources do not satisfy a system resource requirement of the target application, release one or more occupied system resources.

10. The terminal according to claim 7, wherein the program, when executed, cause the one or more processors further to:
predict, based on the current status of the terminal, a plurality of target applications to be used; and
collect statistics on a system resource required by each of the plurality of target applications;
determine a maximum volume of each type of system resource in system resources required by the plurality of target applications; and
reserve each type of system resource for one or more of the plurality of target applications based on types of the system resources and the maximum volume of each type of system resource.

11. The terminal according to claim 7, wherein the program, when executed, cause the one or more processors further to: start to predict the target application after a foreground-background switching instruction is received.

12. A non-transitory computer storage medium, comprising a computer program when performing by one or more processors cause the one or more processors to perform operations comprising:
predicting, by a terminal based on a current status of the terminal, a target application to be used, wherein the current status comprises remaining power information;
predicting, by the terminal and based on a machine learning model, a use time point of the target application, wherein the machine learning model comprises a hidden Markov model, the hidden Markov model includes at least one visible state and at least one hidden state, the at least one hidden state includes at least one of geographical location information of the terminal, the remaining power information of the terminal, or current time information of the terminal, and the at least one visible state includes a state in which the target application is used or a state in which the target application is not used, and the hidden Markov model includes a model parameter that indicates a weight of impact of the at least one hidden state on the at least one visible state;
reserving, by the terminal for the target application based on a result of the predicting of the target application and the use time point, a system resource required for running the target application before the use time point; and
providing, by the terminal according to a resource allocation request of the target application, the reserved system resource for the target application.

* * * * *